(12) United States Patent
Kasai

(10) Patent No.: US 11,902,693 B2
(45) Date of Patent: Feb. 13, 2024

(54) IMAGE PROCESSING DEVICE AND IMAGE PROCESSING METHOD

(71) Applicant: Roland Corporation, Shizuoka (JP)

(72) Inventor: Yoshihide Kasai, Shizuoka (JP)

(73) Assignee: Roland Corporation, Shizuoka (JP)

( * ) Notice: Subject to any disclaimer, the term of this patent is extended or adjusted under 35 U.S.C. 154(b) by 69 days.

(21) Appl. No.: 17/166,989

(22) Filed: Feb. 3, 2021

(65) Prior Publication Data

US 2021/0243385 A1    Aug. 5, 2021

(30) Foreign Application Priority Data

Feb. 4, 2020    (JP) ................. 2020-017056

(51) Int. Cl.
| | |
|---|---|
| H04N 5/262 | (2006.01) |
| G06T 7/11 | (2017.01) |
| G06T 5/00 | (2006.01) |
| H04N 5/265 | (2006.01) |
| G06T 5/40 | (2006.01) |
| H04N 23/71 | (2023.01) |
| H04N 23/76 | (2023.01) |

(52) U.S. Cl.
CPC ........... *H04N 5/2622* (2013.01); *G06T 5/009* (2013.01); *G06T 5/40* (2013.01); *G06T 7/11* (2017.01); *H04N 5/265* (2013.01); *H04N 5/2628* (2013.01); *H04N 23/71* (2023.01); *H04N 23/76* (2023.01); *G06T 2207/20221* (2013.01)

(58) Field of Classification Search
None
See application file for complete search history.

(56) References Cited

U.S. PATENT DOCUMENTS

| | | | | | |
|---|---|---|---|---|---|
| 5,848,181 | A | * | 12/1998 | Ogata | G06T 7/11 |
| | | | | | 348/606 |
| 2013/0016255 | A1 | * | 1/2013 | Bhatt | G06T 3/40 |
| | | | | | 348/240.2 |
| 2013/0182185 | A1 | * | 7/2013 | Koyama | H04N 5/202 |
| | | | | | 348/672 |
| 2017/0004752 | A1 | * | 1/2017 | Hasegawa | B42D 9/06 |
| 2018/0143756 | A1 | * | 5/2018 | Mildrew | G06T 19/003 |
| 2019/0253623 | A1 | | 8/2019 | Lim et al. | |
| 2021/0233218 | A1 | * | 7/2021 | Osawa | G06T 5/20 |

FOREIGN PATENT DOCUMENTS

| | | | | | |
|---|---|---|---|---|---|
| CN | 101631200 B | * | 4/2012 | ......... | G06K 9/00228 |
| JP | 2015195477 | | 11/2015 | | |
| JP | 2017028633 | | 2/2017 | | |
| JP | 2018007133 | | 1/2018 | | |
| JP | 2019028802 | | 2/2019 | | |

OTHER PUBLICATIONS

English translation of CN 101631200 B, Ikeda, 2009 (Year: 2009).*
"Office Action of Japan Counterpart Application", dated Nov. 14, 2023, with English translation thereof, p. 1-p. 8.

* cited by examiner

*Primary Examiner* — James M Hannett
(74) *Attorney, Agent, or Firm* — JCIPRNET

(57) ABSTRACT

An image processing device is provided. The image processing devices includes an input part configured to input an input image; a cutout part configured to cut out a plurality of image regions from the input image input by the input part; and a luminance change part configured to execute luminance change of each of the image regions cut out by the cutout part.

19 Claims, 9 Drawing Sheets

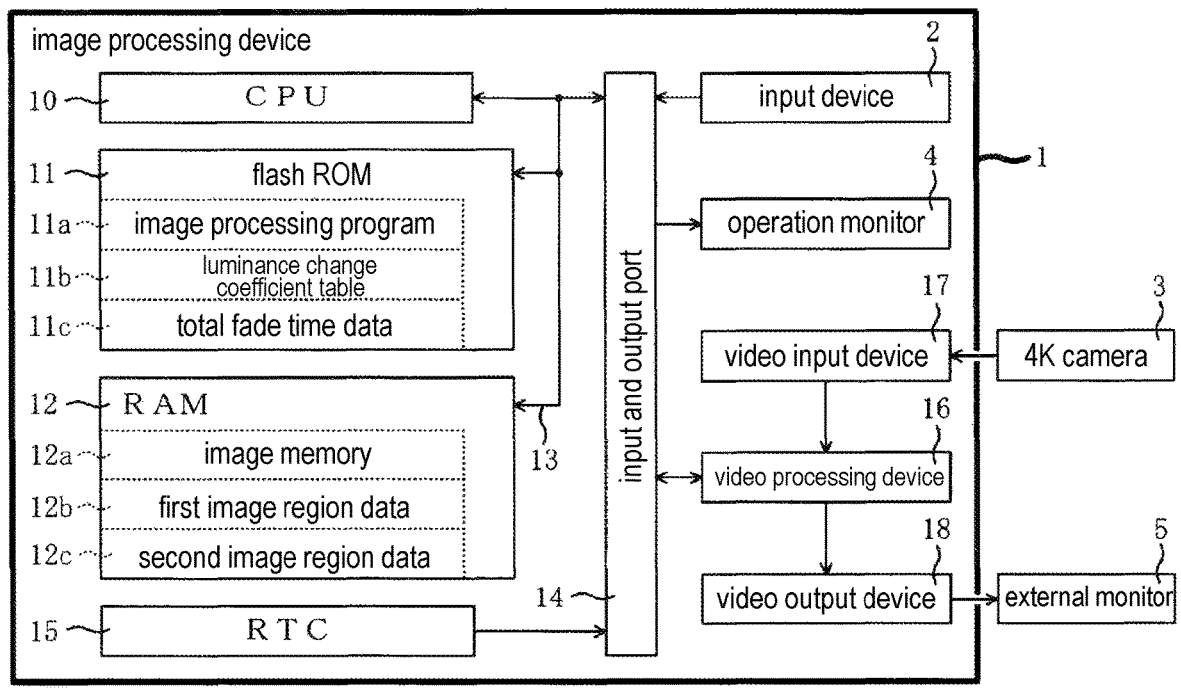
FIG. 2(a)
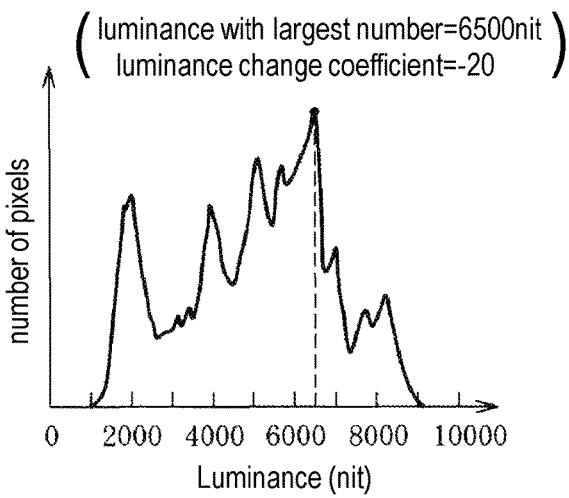
FIG. 2(b)
FIG. 2(c)
FIG. 2(d)

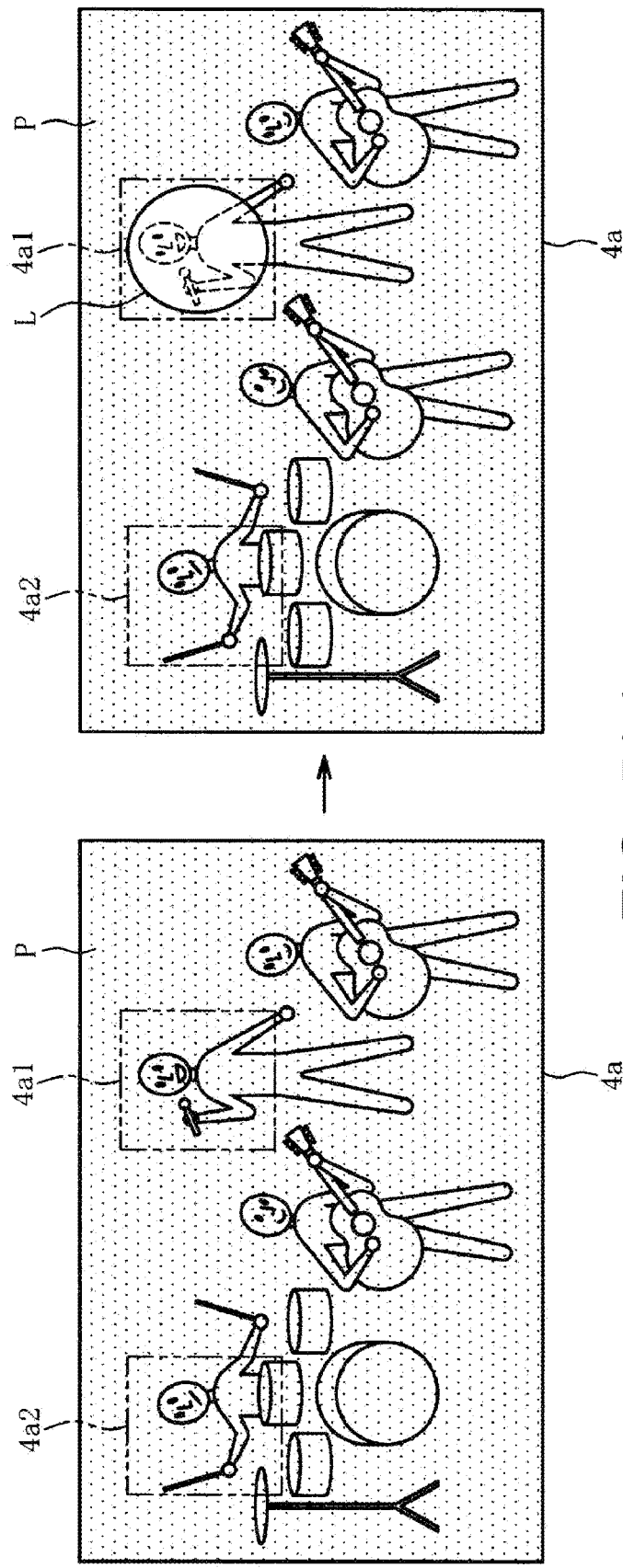
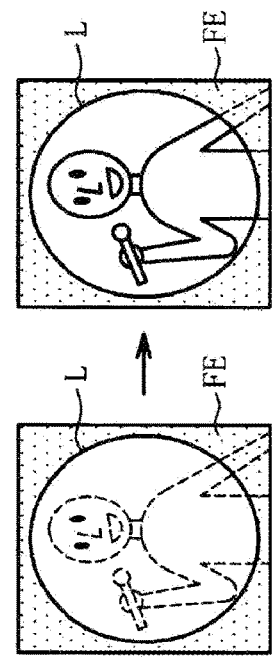
FIG. 5(a)
FIG. 5(b)

| luminance range with largest number of pixels(nit) | luminance tendency |
|---|---|
| 0〜3333 | low tendency |
| 3334〜6666 | medium tendency |
| 6667〜10000 | high tendency | past luminance data 12b6

| No. | luminance HG | luminance change coefficient |
|---|---|---|
| 1 | luminance HG_A | 32 |
| 2 | luminance HG_B | 31 |
| 3 | luminance HG_C | 28 |

IMAGE PROCESSING DEVICE AND IMAGE PROCESSING METHOD

CROSS-REFERENCE TO RELATED APPLICATION

This application claims the priority of Japan patent application serial no. 2020-017056, filed on Feb. 4, 2020. The entirety of the above-mentioned patent application is hereby incorporated by reference herein and made a part of this specification.

BACKGROUND

Technical Field

The present invention relates to an image processing device, an image processing program, and an image processing method.

Description of Related Art

Patent Document 1 discloses cutting out a plurality of image regions from an input image and performing gradation change (luminance change) of the input image on the basis of a gradation range of interest of all the cut-out image regions. Accordingly, it is possible to enhance gradation of the plurality of image regions obtained from the input image.

PATENT DOCUMENTS

[Patent Document 1] Japanese Patent Laid-Open No. 2019-028802 (for example, claim 1, paragraphs 0032-0067, and FIGS. 1 and 6).

SUMMARY

According to an embodiment, an image processing device of the disclosure includes an input part configured to input an input image; a cutout part configured to cut out a plurality of image regions from the input image input by the input part; and a luminance change part configured to execute luminance change of each image region cut out by the cutout part.

According to an embodiment, an image processing device of the disclosure includes a cutout part configured to cut out a plurality of image regions from an input image; and a switching image generation part configured to generate an image gradually changed from one of the image regions to another image region, the image regions being cut out by the cutout part.

An image processing method of the disclosure is an image processing method executed by an image processing device, the image processing method including: an input step of inputting an input image; a cutout step of cutting out a plurality of image regions from the input image input in the input step; a luminance information calculation step of calculating luminance information for each image region cut out in the cutout step, the luminance information being information on luminance; and a luminance change step of executing luminance change of the image region on the basis of the luminance information for each image region calculated in the luminance information calculation step.

According to an embodiment, an image processing method of the disclosure includes inputting an input image; cutting out a plurality of image regions from the input image; and executing luminance change of each of the image regions that has been cut out.

BRIEF DESCRIPTION OF THE DRAWINGS

FIG. 2(*a*) is a block diagram illustrating an electrical configuration of the image processing device, FIG. 2(*b*) is a diagram schematically illustrating a luminance change coefficient table, FIG. 2(*c*) is a diagram illustrating an example of a luminance histogram of an attention point region, and FIG. 2(*d*) is a diagram schematically illustrating first image region data.

FIG. 5(*a*) is a diagram illustrating a case in which luminance of an input image changes with time in a second embodiment, and FIG. 5(*b*) is a diagram illustrating a case in which luminance change is performed in the second embodiment.

DESCRIPTION OF THE EMBODIMENTS

Since the gradation change in Patent Document 1 is performed on the entire input image, gradation change of the same aspect is performed on all of a plurality of image regions. Therefore, appropriate gradation is not necessarily obtained for each image region. In particular, when there is a large deviation in luminance between the image regions in the input image, for example, when image regions including a large number of high-luminance pixels (hereinafter referred to as "high-luminance image regions") in the plurality of image regions outnumber image regions including a large number of low-luminance pixels (hereinafter referred to as "low-luminance image regions"), the gradation change of the input image is performed according to the large number of high-luminance image regions. Therefore, the gradation can be expressed richly in high-luminance regions, whereas the gradation in the low-luminance regions becomes poor. Accordingly, in the low-luminance image regions, much "blackout" in which a portion of the low-luminance regions becomes excessively dark occurs.

On the other hand, when the low-luminance image regions outnumber the high-luminance image regions in a plurality of image regions, the gradation change of the input image is performed according to the larger number of low-luminance image regions, and thus the gradation can be expressed richly in the low-luminance regions, whereas the gradation in the high-luminance regions becomes poor. Accordingly, in the high-luminance image regions, much "whiteout" in which a portion of the high-luminance regions becomes excessively bright occurs.

According to an embodiment, the above problems may be solved. The disclosure provides an image processing device, an image processing program, and an image processing method in which, even when a plurality of image regions is cut out from an input image, luminance of each image region is made appropriate such that blackout or whiteout of the image region can be curbed.

Figure 1A:
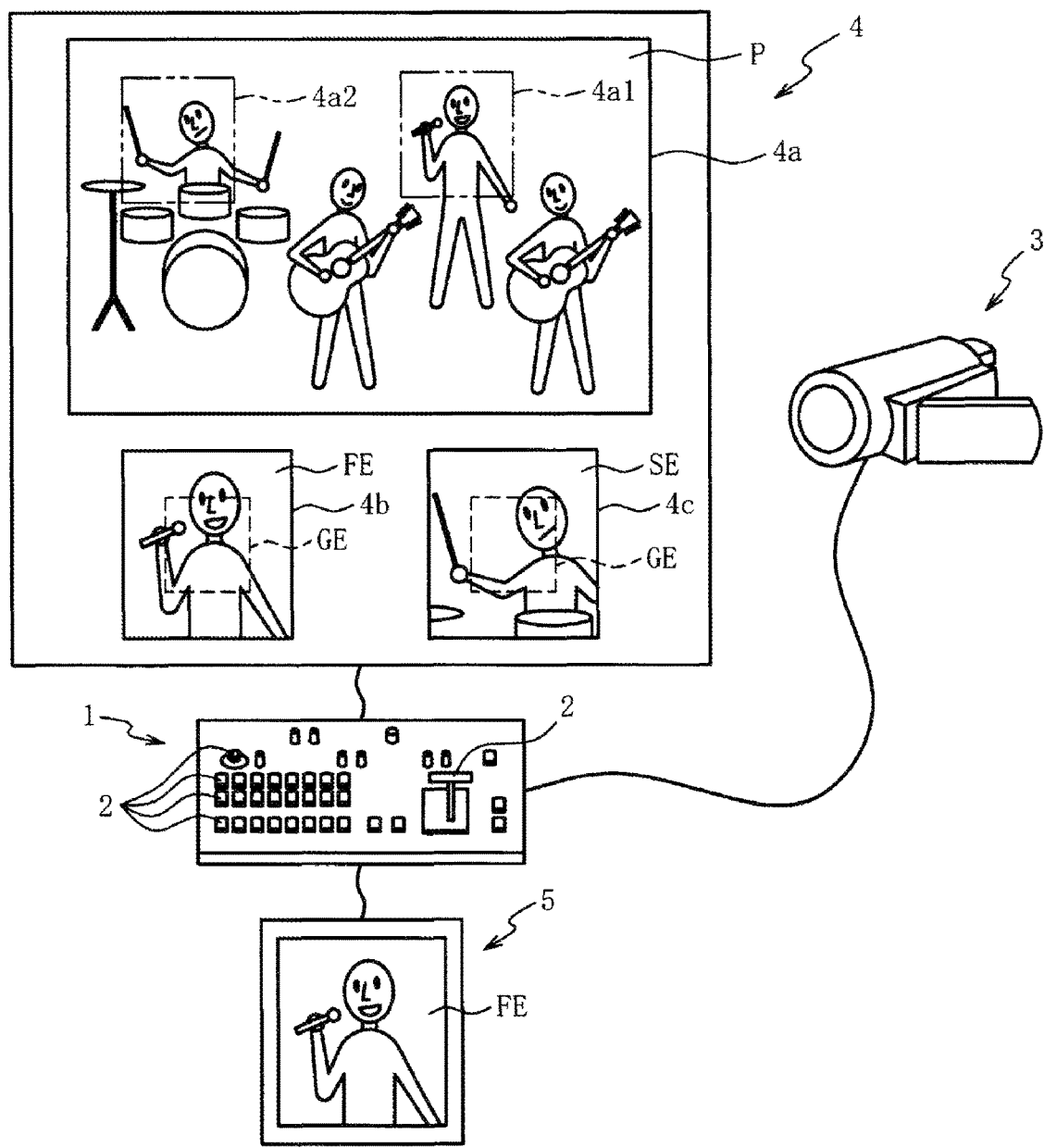
FIG. 1(*a*) is an external view of an image processing device, and FIG. 1(*b*) is a diagram illustrating a case of crossfading from a first image region to a second image region.

Hereinafter, preferred embodiments will be described with reference to the accompanying drawings. An overview of an image processing device 1 of the present embodiment will be described with reference to FIG. 1. FIG. 1(a) is an external view of the image processing device 1. The image processing device 1 is a device that cuts out a plurality of image regions from an input image and outputs the cut-out image regions.

The image processing device 1 is provided with an input device 2 for inputting an instruction from a user. Further, a 4K camera 3, an operation monitor 4, and an external monitor 5 are connected to the image processing device 1. The 4K camera 3 is a device that inputs an input image P that is an image having a 4K resolution (horizontal direction: 3840 pixels and vertical direction: 2160 pixels).

The operation monitor 4 is a device that displays the input image P acquired by the 4K camera 3 and an image region cut out from the input image. An input image area 4a, a first image region area 4b, and a second image region area 4c are displayed on the operation monitor 4. The input image area 4a is an area in which the input image is displayed. In the input image area 4a, a first area 4a1 and a second area 4a2 are displayed.

A range of a first image region FE, which is an image region in the input image P set by the input device 2, is displayed in the first area 4a1, and a range of a second image region SE, which is an image region in the input image P set by the input device 2 and is an image region different from the first image region FE, is displayed in the second area 4a2.

The user operates the input device 2 while viewing the first area 4a1 displayed in the input image area 4a to set a position of the first image region FE in the input image P, and similarly operates the input device 2 while viewing the second area 4a2 displayed on the input image area 4a to set a position of the second image region SE in the input image P. Hereinafter, the first image region FE and the second image region SE are collectively referred to as "first and second image regions FE and SE."

An image is cut out from the input image P on the basis of the first and second image regions FE and SE set in this way. Accordingly, two images of the first and second image regions FE and SE can be acquired from the input image P acquired by one 4K camera 3 without using two cameras.

Further, in the present embodiment, a range of luminance of the input image P is a high dynamic range (HDR), and specifically, is a luminance range of 0 to 10000 nits. On the other hand, the range of luminance of the first image region and the second image region is defined as a standard dynamic range (SDR), and has a range of luminance of 0 to 100 nits, which is narrower than HDR. When the first and second image regions FE and SE in a narrow range of the luminance are cut out from the input image P in a wide range of the luminance, it is necessary to perform luminance change in order to make the luminance of the first and second image regions FE and SE after cutting out appropriate so that "blackout" in which a portion having a low-luminance region becomes excessively dark or "whiteout" in which a portion of a high-luminance region becomes excessively bright are curbed.

In the present embodiment, luminance change of the respective image regions is performed on the basis of luminance of respective attention point regions GE of the first and second image regions FE and SE. Accordingly, the luminance of the first and second image regions FE and SE can be set according to the luminance of the respective attention point regions GE, and thus the luminance of each of the first and second image regions FE and SE is made appropriate such that the occurrence of blackout and whiteout can be curbed.

Specifically, the attention point region GE is set in each of the first and second image regions FE and SE, and positions of the attention point regions GE are displayed in each of the first area 4a1 and the second area 4a2. The attention point region GE is a region that is set in a central portion of each of the first and second image regions FE and SE and serves as a reference for luminance in the respective luminance changes of the first and second image regions FE and SE. Specifically, the attention point region GE is a region having an area set to ¼ of a region of the first and second image regions FE and SE in a state in which an aspect ratio of the first and second image regions FE and SE is fixed, and a center position of the region is set to be the same position as a center position of the first and second image regions FE and SE.

In the first and second image regions FE and SE, targets such as a person or an object to be noted are often placed in the central portion thereof. Therefore, the central portions of the first and second image regions FE and SE are set as the respective attention point region GE and the luminance change is performed on the basis of the luminance of the attention point region GE, such that luminance of a target to be noted can be made appropriate and the target to be noted can be displayed more clearly. The attention point region GE is not limited to being displayed in the first area 4a1 and the second area 4a2, and the attention point region GE may be not displayed or may be switched between display and non-display according to an instruction of the user input via the input device 2.

The external monitor 5 is a display device connected to the image processing device 1. The input image, the first image region FE, or the second image region SE is displayed on the external monitor 5 according to an instruction from the input device 2. A so-called crossfaded image gradually switched from the first image region FE to the second image region SE is also output on the external monitor 5. The crossfading will be described with reference to FIG. 1(b).

Figure 1B:
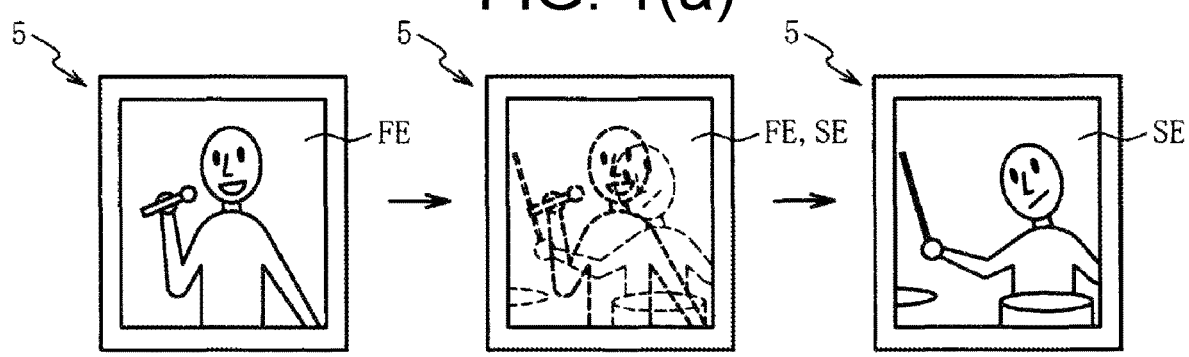

FIG. 1(b) is a diagram illustrating a case of crossfading from the first image region FE to the second image region SE. As illustrated in FIG. 1(b), when crossfading from the first image region FE to the second image region SE is performed, the first image region FE and the second image region SE are displayed first, and then the transmittance (mixing ratio) indicating transmittance of the first image region FE is set to "0%" indicating no transmission, and the transmittance of the second image region SE is set to "100%" indicating full transmission. Accordingly, only the first image region FE is displayed on the external monitor 5.

Thereafter, the transmittance of the second image region SE is decreased while the transmittance of the first image region FE is increased so that the first image region FE and the second image region SE are displayed in an overlapping aspect. At a point in time when the transmittance of the first image region FE becomes "100%" and the transmittance of the second image region SE becomes "0%," only the second image region SE is displayed on the external monitor 5. Accordingly, gradual switching from the first image region FE to the second image region SE is performed.

Although details will be described below, in the present embodiment, when switching is performed from the first image region FE to the second image region SE, luminance change is performed on the first image region FE so that the luminance of the attention point region GE of the first image region FE matches luminance of the attention point region GE of the second image region SE. Accordingly, it is possible to curb a sudden change in luminance when switching from the first image region FE to the second image region SE is performed and thus, it is possible to curb a user's discomfort with respect to the change in luminance.

Next, an electrical configuration of the image processing device 1 will be described with reference to FIG. 2. FIG. 2(a) is a block diagram illustrating an electrical configuration of the image processing device 1. As illustrated in FIG. 2(a), the image processing device 1 includes a CPU 10, a flash ROM 11, and a RAM 12, which are connected to an input and output port 14 via a bus line 13. Further, the input device 2 and the operation monitor 4 described above, a real-time clock (RTC) 15 for measuring a date and time, and a video processing device 16 are connected to the input and output port 14.

Figure 3:
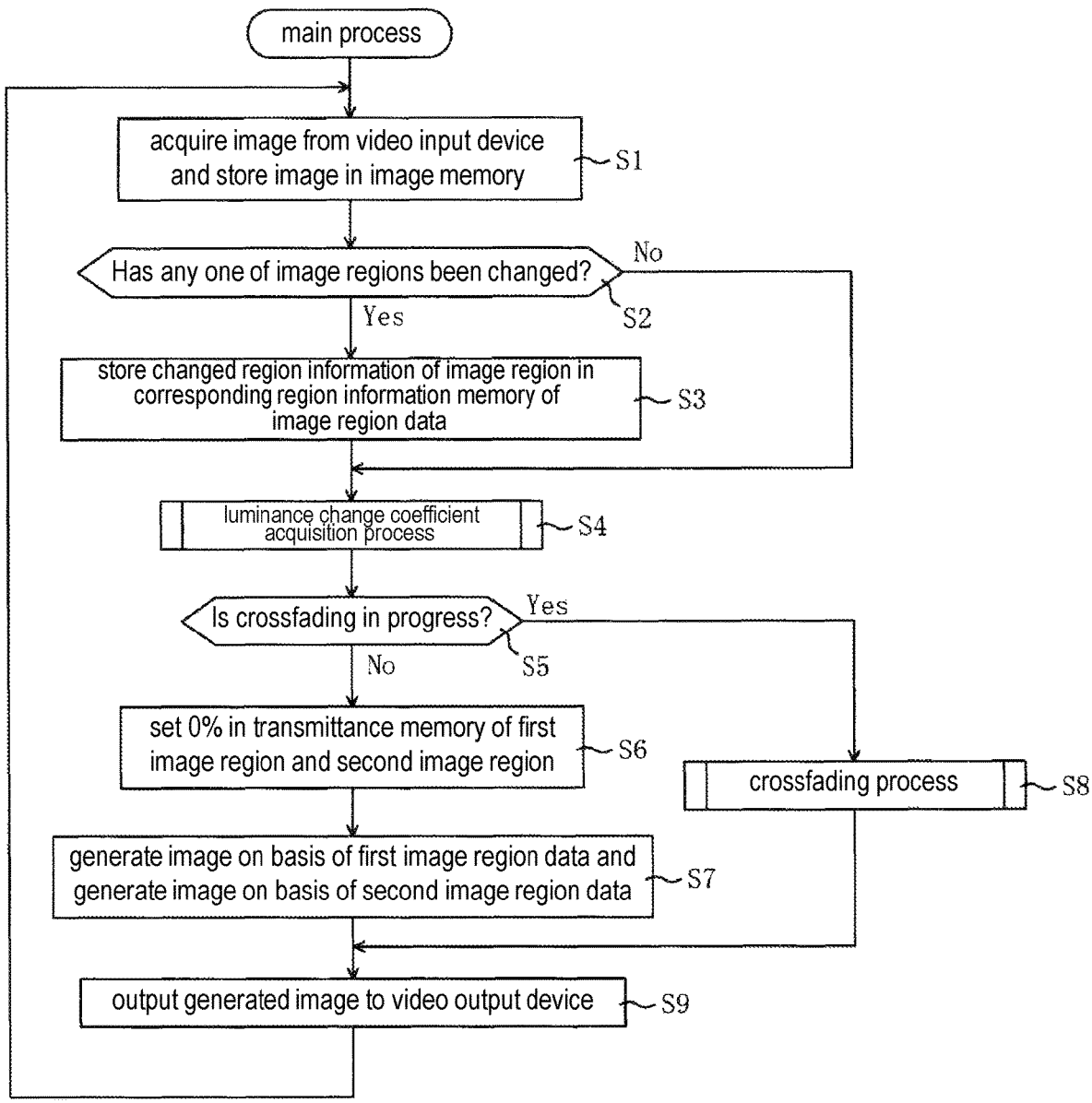
FIG. 3 is a flowchart of a main process.

The CPU 10 is an arithmetic device that controls each part connected by the bus line 13. The flash ROM 11 is a rewritable non-volatile storage device that stores a program that is executed by the CPU 10, fixed value data, and the like, and an image processing program 11a, a luminance change coefficient table 11b, and total fade time data 11c are stored. When the image processing program 11a is executed in the CPU 10, the main process of FIG. 3 is executed.

The luminance change coefficient table 11b is a data table in which a luminance change coefficient corresponding to the luminance of the attention point region GE is stored. The luminance change coefficient table 11b will be described with reference to FIGS. 2(b) and 2(c).

FIG. 2(b) is a diagram schematically illustrating the luminance change coefficient table 11b. As illustrated in FIG. 2(b), the luminance change coefficient that is used for luminance change corresponding to luminance with the largest number of pixels in the attention point region GE (represented as "luminance with the largest number" in FIG. 2(b)) is stored in the luminance change coefficient table 11b.

The luminance change coefficient in the present embodiment is set in 128 steps from −64 to +63. When a value of the luminance change coefficient is greater, that is, the value is closer to +63, luminance of a low-luminance pixel becomes higher due to the luminance change. Therefore, the luminance change is performed with a great luminance change coefficient so that a dark part can be clearly displayed. On the other hand, when the value of the luminance change coefficient is smaller, that is, the value is closer to −64, luminance of a high luminance pixel is decreased through the luminance change. Therefore, the luminance change is performed with a small luminance change coefficient so that the bright part can be clearly displayed.

In the luminance change coefficient table 11b, a luminance change coefficient having a larger value is set when the luminance with the largest number of pixels in the attention point region GE is lower, and a luminance change coefficient having a smaller value is set when the luminance with the largest number of pixels in the attention point region GE is higher.

Accordingly, the luminance change coefficient corresponding to the luminance of the attention point region GE can be obtained from the luminance change coefficient table 11b and the luminance change is performed, such that the attention point region GE can be changed to an appropriate luminance. Here, acquisition of the luminance change coefficient from the luminance change coefficient table 11b will be described with reference to FIG. 2(c).

FIG. 2(c) is a diagram illustrating an example of a luminance histogram of the attention point region GE. Details will be described below, but in the present embodiment, a luminance histogram that is a histogram representing the number of pixels for each luminance is created as luminance information that is information on the luminance of the attention point region GE of each of the first and second image regions FE and SE, and a luminance with the largest number of pixels in the luminance histogram is referred to in the luminance change coefficient table 11b so that a luminance change coefficient is obtained.

Specifically, when the luminance with the largest number of pixels in the luminance histogram in FIG. 2(c) is "6500 nits", the "luminance with the largest number" including "6500 nits" in the luminance change coefficient table 11b is "6475 to 6552 (nits)". Therefore, a luminance change coefficient "−20" corresponding to such a range is acquired from the luminance change coefficient table 11b.

Referring back to FIG. 2(a), a total fade time, which is a time from start to end of switching from the first image region FE to the second image region SE described above in FIG. 1(b) is stored in the total fade time data 11c. In the present embodiment, "two seconds" are set as the total fade time, but the total fade time is not limited to two seconds and may be longer than two seconds or shorter than two 2 seconds or may be a time set by the user via the input device 2.

The RAM 12 is a memory for rewritably storing various types of work data, flags, and the like when the CPU 10 executes the image processing program 11a, and the input image memory 12a in which the above-described input image P is stored, first image region data 12b, and second image region data 12c are provided.

Information on the first image region FE is stored in the first image region data 12b, and information on the second image region SE is stored in the second image region data 12c. Here, the first image region data 12b will be described with reference to FIG. 2(d). Since the second image region data 12c has the same data structure as the first image region data 12b, the illustration is omitted.

FIG. 2(d) is a diagram schematically illustrating the first image region data 12b. In the first image region data 12b, a region information memory 12b1 indicating a range of the first image region FE in the input image P, a attention luminance histogram (HG) memory 12b2 in which the luminance histogram of the attention point region GE of the first image region FE is stored, a luminance change coefficient memory 12b3 in which the luminance change coefficient of the first image region FE is stored, and a transmittance memory 12b4 in which a transmittance of the first image region FE is stored are provided.

Although not illustrated, a region information memory 12c1 indicating a range of the second image region SE in the input image P, a attention luminance HG memory 12c2 in which the luminance histogram of the attention point region GE of the second image region SE is stored, a luminance change coefficient memory 12c3 in which the luminance change coefficient of the second image region SE is stored, and a transmittance memory 12c4 in which a transmittance of the second image region SE is stored are provided in the second image region data 12c, as in the first image region data 12b.

The video processing device 16 is an arithmetic device that performs luminance change of the first image region FE, the second image region SE, or the like, and image processing such as crossfading according to an instruction from the CPU 10. A video input device 17 that inputs an image on which the video processing device 16 performs image processing, and a video output device 18 that outputs an image on which the video processing device 16 has performed image processing are connected to the video processing device 16.

The 4K camera 3 described above is connected to the video input device 17, and the input image P from the 4K camera 3 is input to the video processing device 16 via the video input device 17. The external monitor 5 described above is connected to the video output device 18, and the image on which the video processing device 16 has performed image processing is output to the external monitor 5 via the video output device 18.

Figure 4B:
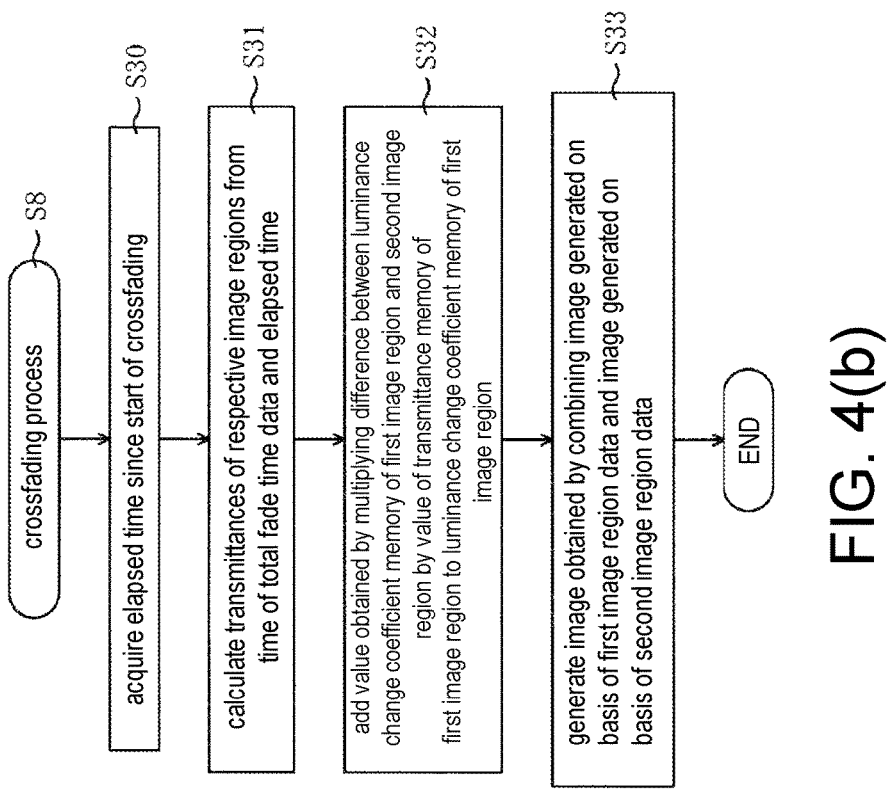
FIG. 4(*a*) is a flowchart of a luminance change coefficient acquisition process, and FIG. 4(*b*) is a flowchart of a crossfading process.

Next, a main process that is executed by the CPU 10 of the image processing device 1 will be described with reference to FIGS. 3 and 4. FIG. 3 is a flowchart of the main process. The main process is a process that is executed after a power of the image processing device 1 is turned on.

In the main process, first, the input image P is acquired from the 4K camera 3 via the video input device 17 and stored in the input image memory 12a (S1). After the process of S1, it is confirmed whether a range of any one of the first and second image regions FE and SE has been changed via the input device 2 (S2). When the range of any one of the first and second image regions FE and SE has been changed in the process of S2 (S2: Yes), the changed range of the first image region FE or the second image region SE is stored in the corresponding region information memory 12b1 or region information memory 12c1 (S3). In the process of S2, when the ranges of both the first and second image regions FE and SE are not changed (S2: No), the process of S3 is skipped.

After the processes of S2 and S3, the luminance change coefficient acquisition process (S4) is performed. The luminance change coefficient acquisition process will be described herein with reference to FIG. 4(a).

Figure 4A:
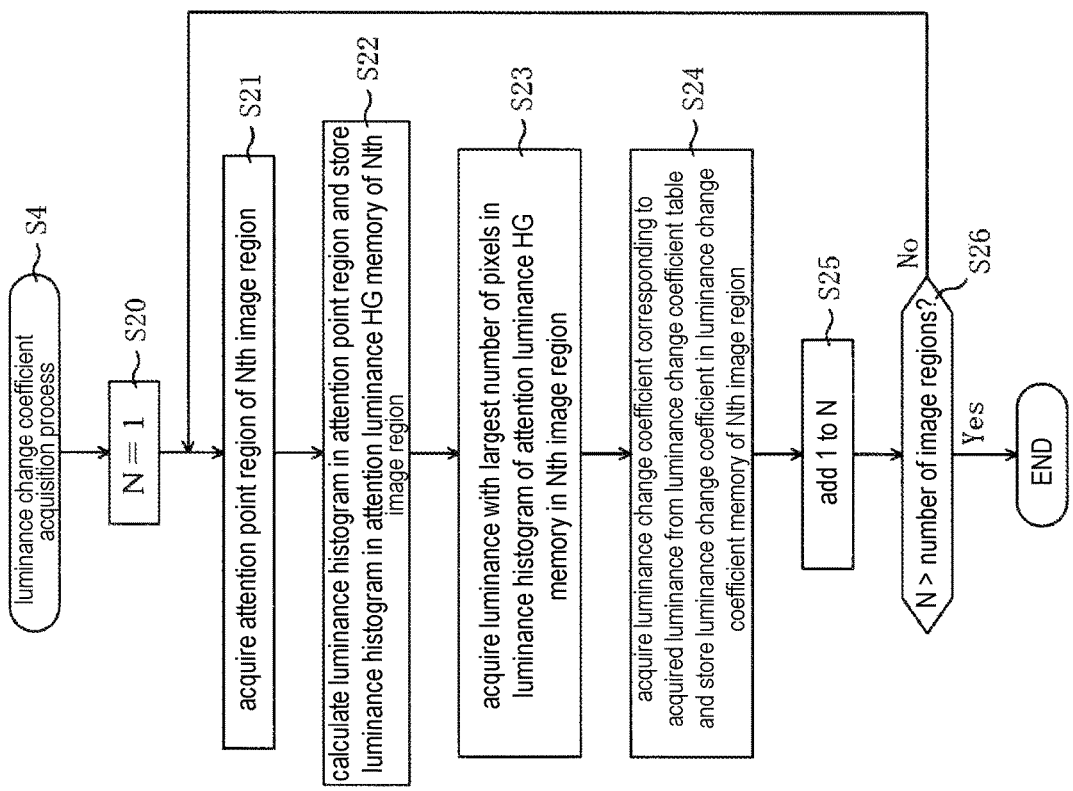

FIG. 4(a) is a flowchart of a luminance change coefficient acquisition process. The luminance change coefficient acquisition process is a process of acquiring the respective attention point region GEs of the first and second image regions FE and SE, and calculating the respective luminance change coefficients from the acquired attention point regions GE.

In the luminance change coefficient acquisition process, first, 1 is set in the counter variable N indicating the image region that is a processing target between the first image region FE and the second image region SE (S20). Hereinafter, in the luminance change coefficient acquisition process, the "Nth image region" represents the first image region FE when N is 1, and represents the second image region SE when N is 2. Further, the "region information memory of the Nth image region" indicates the "region information memory 12b1 of the first image region data 12b" when N is 1, and indicates the "region information memory 12c1 of the second image region data 12c" when N is 2. Memory names included in the first image region data 12b and the second image region data 12c other than the region information memory have the same notation.

After the process of S20, the above-described attention point region GE in a region of the region information memory of the Nth image region is acquired (S21). After the process of S21, the luminance histogram in the attention point region GE of the Nth image region is calculated from the input image P and stored in the attention luminance HG memory of the Nth image region (S22).

After the process of S22, the luminance with the largest number of pixels is acquired in the luminance histogram of the attention luminance HG memory in the Nth image region (S23). After the process of S23, the luminance change coefficient corresponding to the luminance with the largest number of pixels acquired in the process of S23 is acquired from the luminance change coefficient table 11b and stored in the luminance change coefficient memory of the Nth image region (S24).

After the process of S24, 1 is added to the counter variable N (S25), and it is confirmed whether the added counter variable N is larger than the number of image regions, that is, 2 in the present embodiment (S26). In the process of S26, when the counter variable N is equal to or smaller than the number of image regions (S26: No), there is an image region for which the luminance change coefficient has not yet been acquired and thus, the process of S21 and subsequent processes are executed. On the other hand, when the counter variable N is larger than the number of image regions (S26: Yes), the luminance change coefficient acquisition process for all the image regions has been completed and thus, the luminance change coefficient acquisition process ends.

From the above, in the luminance change coefficient acquisition process, the luminance change coefficient used for luminance change of each of the first image region FE and the second image region SE is acquired on the basis of the luminance with the largest number of pixels in each attention point region GE. When there are light and darkness in the input image P, a luminance distribution between the first image region FE and the second image region SE may differ depending on a position at which the first image region FE and the second image region SE are cut out from the input image P.

Even in such a case, the luminance change coefficient used for the luminance change of each of the first image region FE and the second image region SE is acquired on the basis of the luminance of each attention point region GE such that luminance change according to the luminance of each of the first image region FE and the second image region SE becomes possible. Through such luminance change, the luminance of each of the first image region FE and the second image region SE can be made appropriate and thus, occurrence of blackout or whiteout in each of the first image region FE and the second image region SE can be curbed.

Referring back to FIG. 3. After the luminance change coefficient processing in S4, it is confirmed whether or not the crossfading from the first image region FE to the second image region SE is in progress (S5). In the present embodiment, the crossfading from the first image region FE to the second image region SE is started according to an instruction of the user from the input device 2, and gradual change from the first image region FE to the second image region SE occurs over the total fade time of the total fade time data 11*c*. In the process of S5, it is confirmed whether or not it is within the total fade time of the total fade time data 11*c* after an instruction to start crossfading is input from the input device 2.

In the process of S5, when the crossfading is not in progress (S5: No), the first image region FE or the second image region SE is output to the external monitor 5 as it is and thus, in such a case, first, "0%", which is a transmittance when the image is not transmitted, is set in the transmittance memory 12*b*4 of the first image region data 12*b* and the transmittance memory 12*c*4 of the second image region data 12*c* (S6).

After the process of S6, an image is generated on the basis of the first image region data 12*b*, and an image is generated on the basis of the second image region data 12*c* (S7). Specifically, first, an image of the region of the region information memory 12*b*1 of the first image region data 12*b* is cut out from the input image P, the luminance change is performed on the cut-out image using the luminance change coefficient of the luminance change coefficient memory 12*b*3, and the cut-out image is transmitted on the basis of the transmittance of the transmittance memory 12*b*4, so that an image by the first image region FE is generated from the input image P.

Similarly, in the second image region SE, an image of the region of the region information memory 12*c*1 of the second image region data 12*c* is cut out from the input image P, luminance change is performed the cut-out image using the luminance change coefficient of the luminance change coefficient memory 12*c*3, and the cut-out image is transmitted on the basis of the transmittance of the transmittance memory 12*c*4, so that an image by the second image region SE is generated from the input image P.

When crossfading is in progress in the process of S5 (S5: No), the crossfading process (S8) is executed. Here, the crossfading process will be described with reference to FIG. 4(*b*).

FIG. 4(*b*) is a flowchart of the crossfading process. The crossfading process is a process of changing the respective transmittances of the first image region FE and the second image region SE according to an elapsed time from the start of the crossfading and combining the first image region FE with the second image region SE to generate an image in an aspect in which crossfading from the first image region FE to the second image region SE is performed.

In the crossfading process, first, an elapsed time since an instruction to start the crossfading has been issued from the input device 2 is acquired using the RTC 15 (S30). After the process of S30, the respective transmittances of the first image region FE and the second image region SE are calculated from the time of the total fade time data 11*c* and the elapsed time acquired in the process of S30, and stored in the transmittance memory 12*b*4 of the first image region data 12*b* and the transmittance memory 12*c*4 of the second image region data 12*c* (S31).

Specifically, for the transmittance of the first image region FE, a value obtained by dividing the elapsed time acquired in the process of S30 by the total fade time of the total fade time data 11*c* is set, and for the transmittance of the second image region SE, a value obtained by subtracting the transmittance of the first image region FE from 1 is set.

After the process of S31, a value obtained by multiplying a difference between the luminance change coefficient of the luminance change coefficient memory 12*b*3 of the first image region data 12*b* and the luminance change coefficient of the luminance change coefficient memory 12*c*3 of the second image region data 12*c* by the transmittance of the transmittance memory 12*b*4 of the first image region data 12*b* is added to the luminance change coefficient memory 12*b*3 of the first image region data 12*b*, and an addition value is stored in the luminance change coefficient memory 12*b*3 of the first image region data 12*b* (S32). Accordingly, the luminance change coefficient of the first image region FE changes from the luminance change coefficient based on the first image region FE to the luminance change coefficient based on the second image region SE according to the change in the transmittance of the first image region FE.

After the process of S32, an image is generated on the basis of the first image region data 12*b*, an image is generated on the basis of the second image region data 12*c*, and these created images are combined (S33). Specifically, the image by the first image region FE is generated on the basis of the first image region data 12*b*, the image by the second image region SE is generated on the basis of the second image region data 12*c*, and an image obtained by combining these generated images is generated, as in the process of S7 of FIG. 3 described above. After the process of S33, the crossfading process ends.

Unlike the process of S7 in FIG. 3, for the transmittances of the first image region FE and the second image region SE, the transmittance according to the elapsed time since the instruction to start the crossfading has been issued is set and thus, the image by the first image region FE and the image by the second image region SE are combined such that an image crossfading from the first image region FE to the second image region SE, that is, an image in an aspect in which the image gradually changes can be generated.

In this case, the luminance change coefficient of the first image region FE is changed from the luminance change coefficient based on the first image region FE to the luminance change coefficient based on the second image region SE according to the change in the transmittance of the first image region FE. Therefore, the luminance of the first image region FE can be approximated to the luminance of the second image region SE according to the change in the transmittance of the first image region FE. Accordingly, even when there is a difference in luminance between the first image region FE and the second image region SE, and crossfading from the first image region FE to the second image region SE is performed for switching, abrupt change in luminance due to the switching can be curbed and thus, it is possible to curb the user's discomfort with respect to the luminance.

Referring back to FIG. 3. The image generated through the processes of S7 and S8 is output to the video output device 18 after the processes of S7 and S8 (S9), so that the generated image is displayed on the external monitor 5. Specifically, when the image generated through the process of S7 is output, the image designated by the user via the input device 2 between the image by the first image region FE and the image by the second image region SE is output to the video output device 18. When the image generated through the process of S8 is output, the image combined in the process of S33 of FIG. 4(*b*) is output to the video output device 18.

Next, the second embodiment will be described with reference to FIGS. 5 to 7. In the first embodiment described above, in the luminance change coefficient acquisition process, each luminance change coefficient has been acquired according to the luminance of the attention point region GE of each of the first image region FE and the second image region SE in the current input image P acquired from the 4K camera 3. On the other hand, in the second embodiment, a luminance tendency indicated by the luminance in the attention point region GE is stored, and the luminance change coefficient is acquired on the basis of a difference between the luminance tendency in the current attention point region GE and a past stored luminance tendency in the attention point region GE. The same parts as those in the first embodiment are denoted by the same reference signs, and description thereof will be omitted.

First, a case in which the luminance changes in the input image P will be described with reference to FIG. 5. FIG. 5(a) is a diagram illustrating an input image P in a case in which the luminance changes with time in the second embodiment, and FIG. 5(b) is a diagram illustrating the luminance change in the second embodiment.

FIG. 5(a) illustrates a case in which the input image P is changed from a dark state in which a person is not illuminated to a state in which a specific person is illuminated by a spotlight L. It is assumed that the first area 4a1 is set near a person illuminated by the spotlight L, and the second area 4a2 is set near a person not illuminated by the spotlight L.

In the first area 4a1, that is, in the first image region FE, the spotlight L is suddenly radiated in a dark state and, the luminance sharply increases, which causes whiteout in the first image region FE. Therefore, in the second embodiment, the luminance change coefficient is changed on the basis of a difference between the past luminance and the current luminance in the attention point region GE of the first image region FE or the second image region SE. Accordingly, since the luminance change coefficient can be changed according to the change in the luminance of the attention point region GE, the luminance of the first image region FE can be made appropriate at an early stage and whiteout in the first image region FE can be eliminated, as illustrated in FIG. 5(b).

Next, the first image region data 12b and the second image region data 12c in the second embodiment will be described with reference to FIG. 6. FIG. 6(a) is a diagram schematically illustrating the first image region data 12b in the second embodiment. As in the first embodiment, since the second image region data 12c in the second embodiment has the same data structure as the first image region data 12b, the illustration is omitted.

A current luminance tendency memory 12b5, past luminance data 12b6, and past luminance tendency memory 12b7, in addition to the region information memory 12b1, the attention luminance HG memory 12b2, the luminance change coefficient memory 12b3 and the transmittance memory 12b4, are provided in the first image region data 12b. The current luminance tendency in the attention point region GE of the first image region FE is stored in the current luminance tendency memory 12b5. The luminance tendency will be described with reference to FIG. 6(b).

Figures 6A, 6B, 6C:
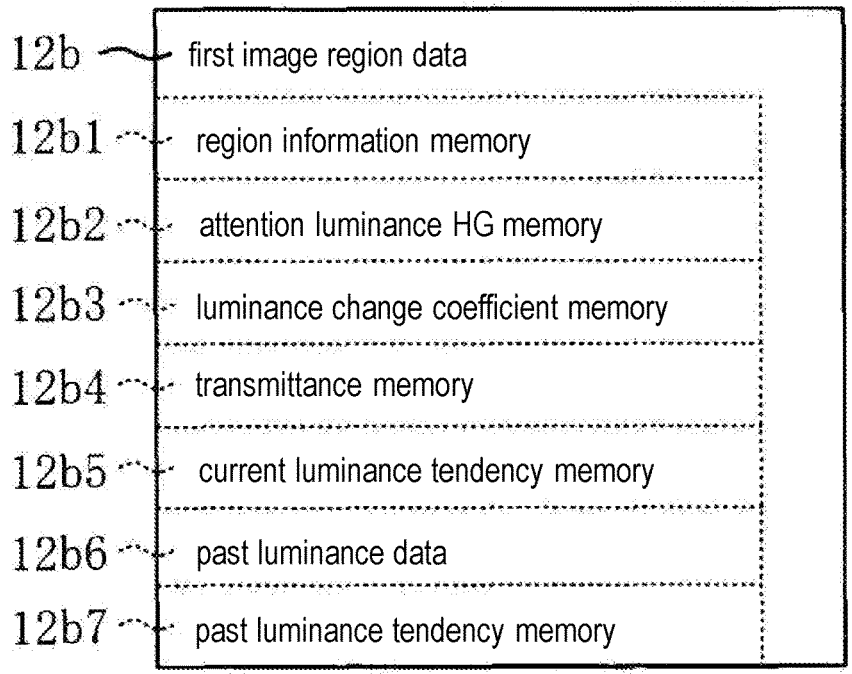
FIG. 6(*a*) is a diagram schematically illustrating first image region data in the second embodiment, FIG. 6(*b*) is a diagram illustrating a luminance tendency corresponding to luminance of an attention point region, and FIG. 6(*c*) is a diagram schematically illustrating past luminance data.
Figure 7:
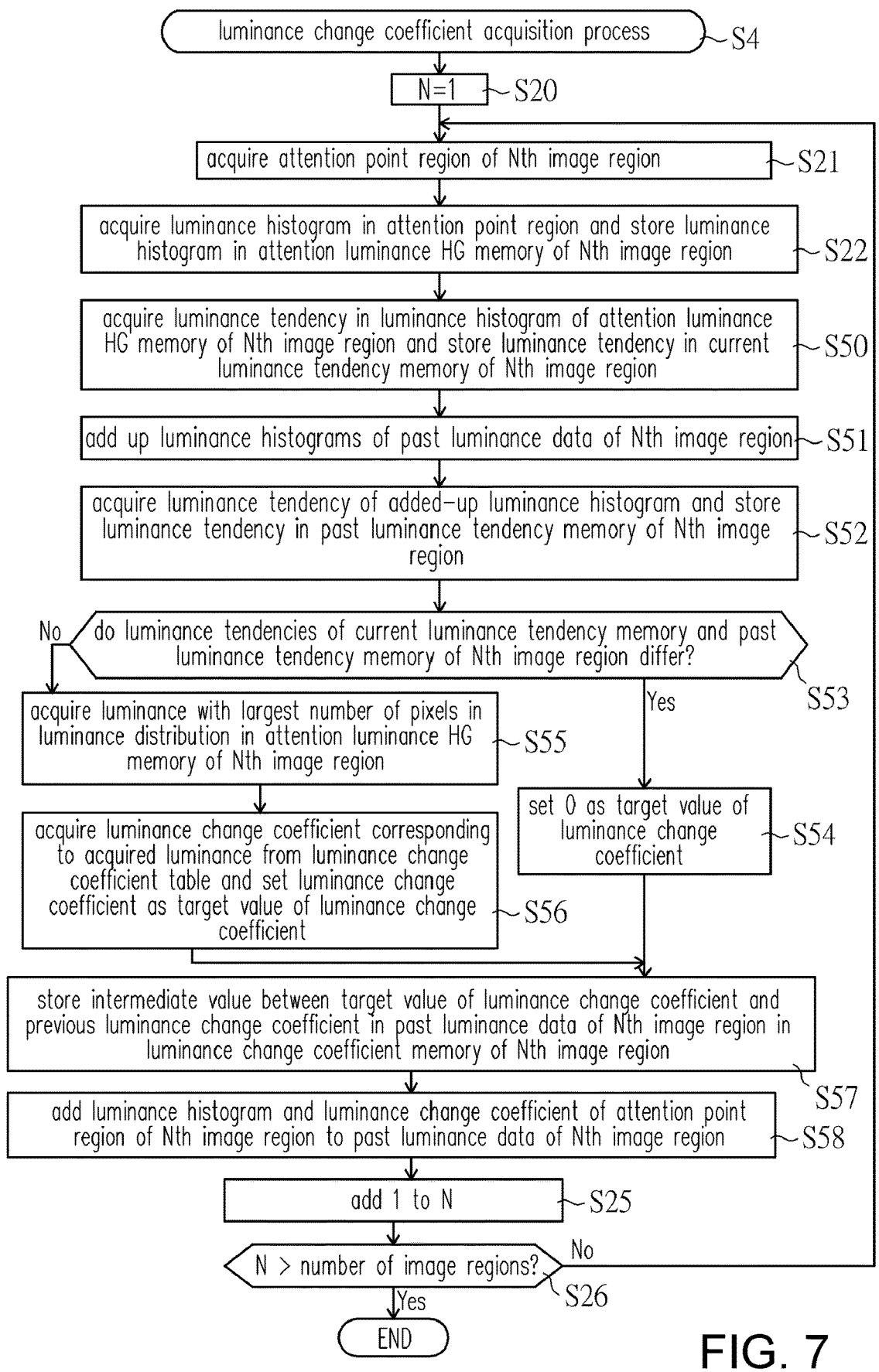
FIG. 7 is a flowchart of a luminance change coefficient acquisition process according to the second embodiment.

FIG. 6(b) is a diagram illustrating a luminance tendency corresponding to the luminance of the attention point region GE. As illustrated in FIG. 6(b), the luminance tendency in the attention point region GE is determined to be any one of low luminance, medium luminance, or high luminance according to the number of pixels corresponding to a predetermined luminance range.

Specifically, as illustrated in FIG. 6(b), when the number of pixels having luminance of 0 to 3333 nits is largest among the pixels in the attention point region GE, the luminance tendency is determined to be "low luminance", when the number of pixels having luminance of 3334 to 6666 nits is largest, the luminance tendency is determined to be "medium luminance", and when the number of pixels having luminance of 6667 to 10000 nits is largest, the luminance tendency is determined to be "high luminance". The current luminance tendency memory 12b5 stores the luminance tendency determined from the attention luminance HG memory 12b2.

Referring back to FIG. 6(a). The past luminance histogram and the luminance change coefficient in the attention point region GE of the first image region FE are stored in the past luminance data 12b6. The past luminance data 12b6 will be described with reference to FIG. 6(c).

FIG. 6(c) is a diagram schematically illustrating the past luminance data 12b6. A recent luminance histogram (luminance HG) and a luminance change coefficient of the attention point region GE for three times among the luminance histograms and the luminance change coefficients of the attention point region calculated in the past luminance change coefficient processing are stored in association with each other in the past luminance data 12b6. When a new luminance histogram and luminance change coefficient are added in a state in which the luminance histogram and the luminance change coefficient of the attention point region for three times are stored in the past luminance data 12b6, the oldest luminance histogram and luminance change coefficient are deleted from the past luminance data 12b6 and then the new luminance histogram and luminance change coefficient are added to the past luminance data 12b6. The number of luminance histograms and luminance change coefficients in the attention point region stored in the past luminance data 12b6 is not limited to three, and may be equal to or smaller than three or may be equal to or greater than three.

Referring back to FIG. 6(a). The past luminance tendency in the attention point region GE determined on the basis of the luminance histogram of the attention point region GE stored in the past luminance data 12b6 is stored in the past luminance tendency memory 12b7.

Although not illustrated, a current luminance tendency memory 12c5 in which a current luminance tendency in the attention point region GE of the second image region SE is stored, past luminance data 12c6 in which a recent luminance histogram of the attention point region GE of the second image region SE and a luminance change coefficient for three times are stored in association with each other, and a past luminance tendency memory 12c7 in which a past luminance tendency in the attention point region GE of the second image region SE is stored, in addition to the region information memory 12c1, the attention luminance HG memory 12c2, the luminance change coefficient memory 12c3, and the transmittance memory 12c4 described above, are provided in the second image region data 12c of the second embodiment.

Next, the luminance change coefficient acquisition process in the second embodiment will be described with reference to FIG. 7. FIG. 7 is a flowchart of the luminance change coefficient acquisition process in the second embodiment. In the luminance change coefficient acquisition process in the second embodiment, after the process of S22 described above, the luminance tendency described above in FIG. 6(b) is acquired from the luminance histogram of the current attention point region GE in the attention luminance HG memory of the Nth image region and stored in the current luminance tendency memory of the Nth image region (S50).

After the process of S50, the luminance histograms of the past luminance data of the Nth image region are added up (S51). Specifically, a luminance histogram is calculated by adding up the numbers of pixels having the same luminance in all the luminance histograms stored in the past luminance data of the Nth image region. After the process of S51, the luminance tendency is acquired from the luminance histogram after adding-up calculated in the process of S50 and stored in the past luminance tendency memory of the Nth image region (S52).

After the process of S52, it is confirmed whether the luminance tendencies of the current luminance tendency memory and the past luminance tendency memory of the Nth image region differ (S53). When the luminance tendencies of the current luminance tendency memory and the past luminance tendency memory of the Nth image region differ (S53: Yes) in the process of S53, "0" is set as a target value of the luminance change coefficient (S54). In the second embodiment, the luminance change coefficient used for the luminance change is calculated by changing the previous luminance change coefficient in the Nth image region through the process of S57 to be described below, but the target value of the luminance change coefficient to be set in S54, and S56, which will be described below, is a luminance change coefficient that is a target at the time of changing from the previous luminance change coefficient.

On the other hand, when the luminance tendencies of the current luminance tendency memory and the past luminance tendency memory of the Nth image region are the same in the process of S53 (S53: No), the luminance with the largest number of pixels is acquired in the luminance histogram in the attention luminance HG memory of the Nth image region (S55). After the process of S55, the luminance change coefficient corresponding to the acquired luminance with the largest number of pixels is acquired from the luminance change coefficient table 11b and set as the target value of the luminance change coefficient (S56).

After the processes of S54 and S56, an intermediate value between the target value of the luminance change coefficient set in the process of S54 or S56 and the previous luminance change coefficient in the past luminance data of the Nth image region is calculated and stored in the luminance change coefficient memory of the Nth image region (S57). Specifically, a value obtained by adding the target value of the luminance change coefficient set in the process of S54 or S56 to the previous luminance change coefficient in the past luminance data of the Nth image region, that is, a luminance change coefficient most recently added in the past luminance data of the Nth image region and dividing a result of the addition by 2 is stored in the luminance change coefficient memory of the Nth image region.

The intermediate value between the target value of the luminance change coefficient and the previous luminance change coefficient in the past luminance data of the Nth image region is not limited thereto, and may be, for example, a value obtained by dividing, by 3, a value obtained by adding the target value of the luminance change coefficient to a value obtained by multiplying the previous luminance change coefficient in the past luminance data of the Nth image region by 2, or may be a value corresponding to any ratio of the target value of the luminance change coefficient to the previous luminance change coefficient in the past luminance data of the Nth image region.

After the process of S57, the luminance histogram of the Nth image region acquired in the process of S50 and the luminance change coefficient calculated in the process of S57 are added to the past luminance data of the Nth image region (S58). After the process of S58, the process of S25 and subsequent processes described above are performed.

As described above, in the luminance change coefficient acquisition process of the second embodiment, when the luminance change coefficient of the Nth image region is calculated, the luminance change coefficient is calculated depending on whether or not the luminance tendencies between the current luminance tendency memory and the past luminance tendency memory of the Nth image region differ.

First, there is a case in which the luminance tendencies of the current luminance tendency memory and the past luminance tendency memory of the Nth image region differ (S53: Yes), that is, a transient case in which the attention point region GE of the Nth image region changes from a high luminance state to a low luminance state or from a low luminance state to a high luminance state. More specifically, the luminance of the attention point region GE changes from a high luminance state to a low luminance via medium luminance or changes from a low luminance state to a high luminance via medium luminance.

In such a case, the target value of the luminance change coefficient is set to "0", which is a luminance change coefficient in a case in which luminance change is performed on the image region having medium luminance, such that the luminance change coefficient changes from the previous luminance change coefficient, that is, a luminance change coefficient in a case in which the luminance change is performed on a high-luminance image region or a luminance change coefficient in a case in which the luminance change is performed on a low-luminance image region to the luminance change coefficient in a case in which luminance change is performed on an image region having medium luminance and thus, the luminance change coefficient can be changed according to the change in the luminance of the attention point region GE. Accordingly, even when the luminance of the attention point region GE of the Nth image region is changed, the luminance of the Nth image region can be made appropriate at an early stage and thus, the occurrence of whiteout or blackout in the Nth image region can be curbed.

On the other hand, when the luminance tendencies of the current luminance tendency memory and the past luminance tendency memory of the Nth image region are the same (S53: No), a luminance change of the attention point region GE of the Nth image region is small, and a current luminance of the attention point region GE may be on an extension of the luminance of the past attention point region GE. In such a case, the target value of the luminance change coefficient is set to the luminance change coefficient according to the luminance of the current attention point region GE, such that luminance change according to the Nth image region in which a change in luminance from the past luminance to the current luminance is small can be performed, and the Nth image region having an appropriate luminance can be acquired.

Further, the luminance change coefficient to be used for the luminance change is set to the intermediate value between the previous luminance change coefficient and the target value of the luminance change coefficient, such that a sudden change in the luminance change coefficient can be curbed. Accordingly, it is possible to curb a sudden change of the Nth image region from high luminance to low luminance or from low luminance to high luminance as a result of the luminance change and thus, it is possible to curb a user's discomfort with respect to the change in luminance.

Figure 8A:
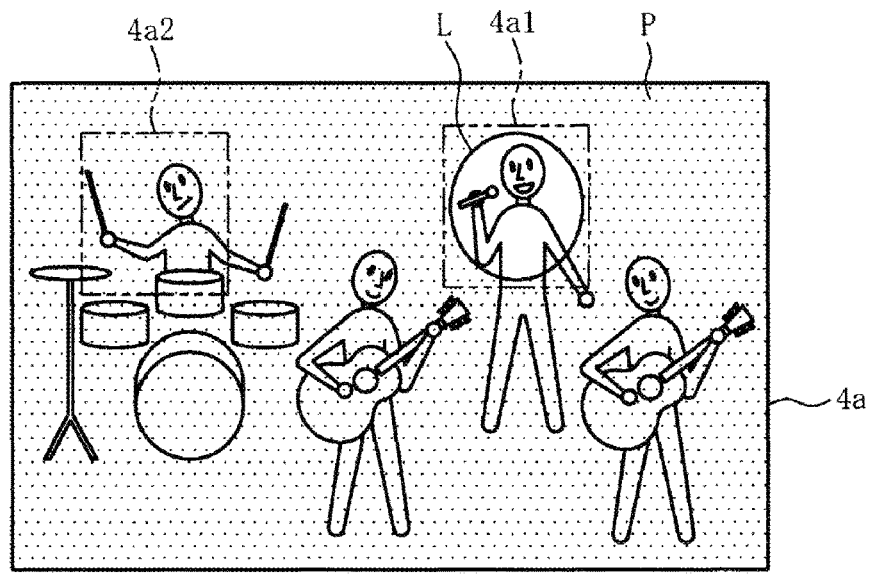
FIG. 8(*a*) is a diagram illustrating an example of an input image in a third embodiment, FIG. 8(*b*) is a diagram illustrating a case in which crossfading from the first image region to the second image region is performed in a state in which an angle of view of the first image region is fixed, FIG. 8(*c*) is a diagram illustrating a change in the angle of view of the first image region in the third embodiment, and FIG. 8(*d*) is a diagram illustrating a case in which crossfading from the first image region to the second image region is performed while changing the angle of view of the first image region in the third embodiment.

Next, the third embodiment will be described with reference to FIGS. 8 and 9. In the first embodiment described above, when switching from the first image region FE to the second image region SE is performed in the crossfading process, the luminance change coefficient of the first image region FE is changed from the luminance change coefficient based on the first image region FE to the luminance change coefficient based on the second image region SE depending on the transmittance of the first image region FE.

On the other hand, in the third embodiment, when switching from the first image region FE to the second image region SE is performed and the luminance change coefficient based on the first image region FE and the luminance change coefficient based on the second image region SE differ, an angle of view of the first image region FE is changed. Accordingly, switching from the first image region FE to the second image region SE is performed while a difference in luminance between the first image region FE and the second image region SE is being reduced. The same parts as those in the first and second embodiments are denoted by the same reference signs, and description thereof will be omitted.

An overview of crossfading in the third embodiment will be described with reference to FIG. 8. FIG. 8(a) is a diagram illustrating an example of the input image P in the third embodiment. A state in which, in the input image P of FIG. 8(a), an overall illumination is turned off and a specific person is illuminated with the spotlight L is shown. It is assumed that the first area 4a1 is set near a person illuminated by the spotlight L, and the second area 4a2 is set near a person not illuminated by the spotlight L. A case in which switching is performed by crossfading from the first image region FE based on the first area 4a1 to the second image region SE based on the second area 4a2 will be described with reference to FIG. 8(b).

Figure 8B:
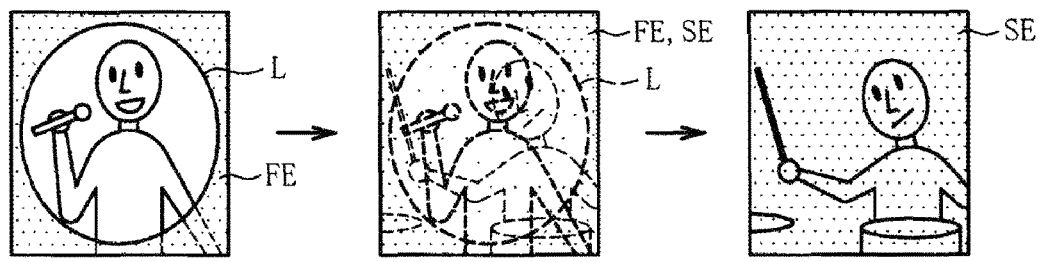
Figure 9:
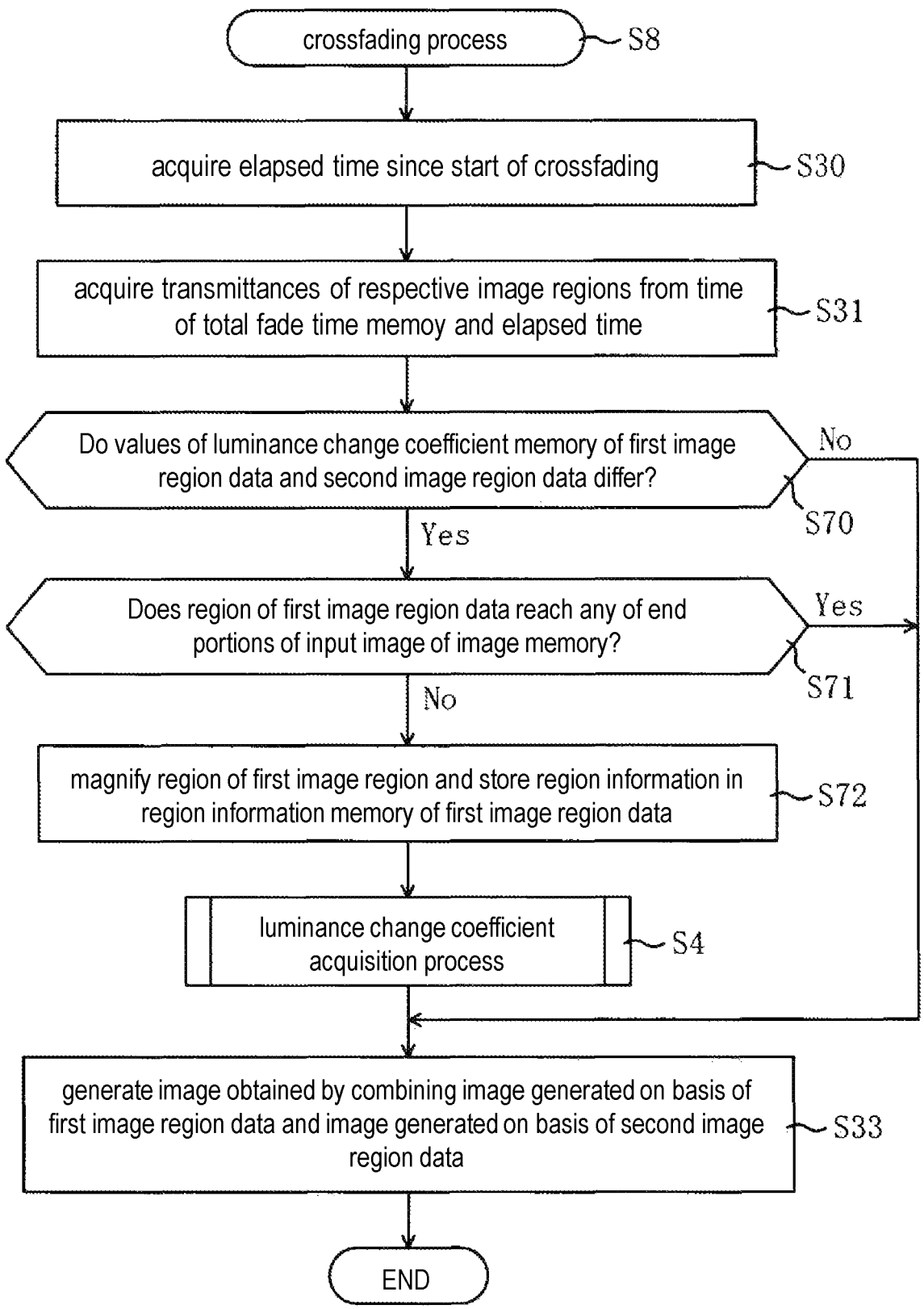
FIG. 9 is a flowchart of a crossfading process according to the third embodiment.

FIG. 8(b) is a diagram illustrating a case in which crossfading from the first image region FE to the second image region SE is performed in a state in which the angle of view of the first image region FE is fixed. In the first image region FE, the spotlight L occupies most of the first image region FE, while a dark portion in which the second image region SE is not illuminated by the spotlight L or an illumination occupies most of the second image region SE. Therefore, when switching from the first image region FE to the second image region SE is performed, switching is performed from the first bright image region FE irradiated with the spotlight L to the second dark image region SE, and thus, a difference in luminance between the first image region FE and the second image region SE may cause the user to feel discomfort.

Therefore, in the third embodiment, when switching from the first image region FE to the second image region SE that is dark is performed and there is a difference in luminance between the first image region FE and the second image region SE, that is, there is a difference in the luminance change coefficient between the first image region FE and the second image region SE, the first image region FE is magnified (zoomed out) and the angle of view is changed so that the difference in luminance between the first image region FE and the second image region SE is reduced. Specifically, changing the angle of view of the first image region FE and switching from the first image region FE to the second image region SE while changing the angle of view of the first image region FE will be described with reference to FIGS. 8(c) and 8(d).

Figure 8C:
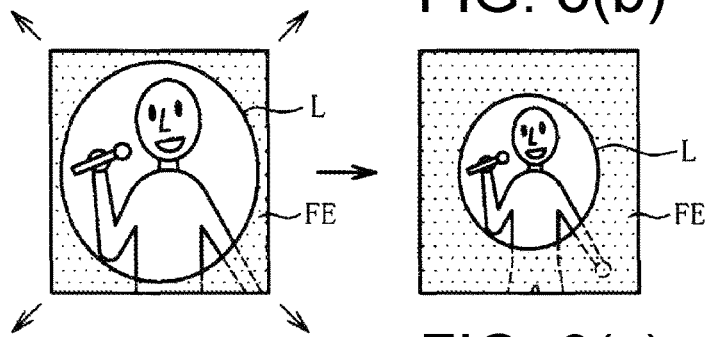
Figure 8D:
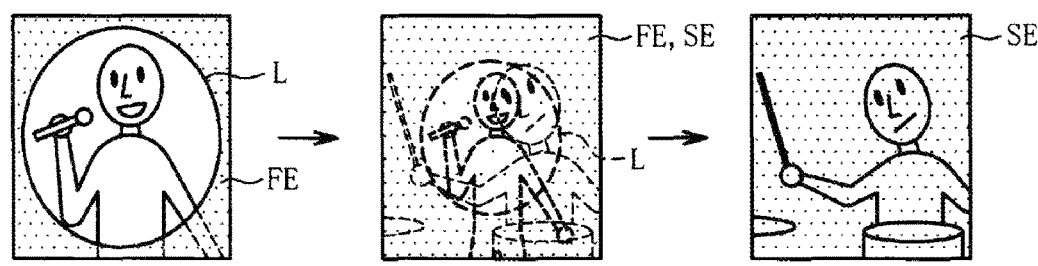

FIG. 8(c) is a diagram illustrating a change in the angle of view of the first image region FE in the third embodiment, and FIG. 8(d) is a diagram illustrating a case in which crossfading from the first image region FE to the second image region SE is performed while changing the angle of view of the first image region FE in the third embodiment. As illustrated in FIG. 8(c), when switching from the first image region FE to the second image region SE is performed, the region of the first image region FE is magnified. Accordingly, the region of the spotlight L in the first image region FE is reduced, and the dark portion in which irradiation is not performed with the spotlight L or the illumination is magnified, so that the overall luminance of the first image region FE is reduced.

As illustrated in FIG. 8(d), switching to the second image region SE is performed while crossfading while magnifying the region of the first image region FE. Therefore, switching from the first image region FE to the second image region SE is performed while the difference in luminance between the first image region FE and the second image region SE is reduced. Accordingly, it is possible to curb discomfort with respect to the luminance of the user when switching from the first image region FE to the second image region SE that is dark is performed.

Next, a crossfading process of the third embodiment will be described with reference to FIG. 9. FIG. 9 is a flowchart of the crossfading process according to the third embodiment. In the crossfading process in the third embodiment, after the process of S31 described above in FIG. 4(b), it is confirmed whether or not the value of the luminance change coefficient memory 12b3 of the first image region data 12b differ from the value of the luminance change coefficient memory 12c3 of the second image region data 12c (S70).

In the process of S70, when a value of the luminance change coefficient memory 12b3 of the first image region data 12b and a value of the luminance change coefficient memory 12c3 of the second image region data 12c differ (S70: Yes), it is confirmed whether a region in the region information memory 12b1 of the first image region data 12b reaches any of end portions of the input image P (S71).

In the process of S71, when the region in the region information memory 12b1 of the first image region data 12b does not reach any of the end portions of the input image P (S71: No), the region of the first image region FE is magnified and information on the region is stored in the region information memory 12b1 of the first image region data 12b (S72).

Specifically, the angle of view is changed (zoomed out) so that an area of the region of the region information memory 12b1 is magnified to 1.1 times while an aspect ratio of the region of the region information memory 12b1 is maintained, and the region according to the changed angle of view is stored in the region information memory 12b1 of the first image region data 12b. In this case, when the region exceeds any of the end portions of the input image P as a result of magnifying an area of the region to 1.1 times, the end portion of the input image P is reset at a magnification so that the end portion becomes an end portion of the corresponding magnified region, and the region based on the magnification is stored in the region information memory 12b1 of the first image region data 12b. A magnification at which the region of the region information memory 12b1 is magnified is not limited to 1.1, and may be greater than 1.1 or may be smaller than 1.1.

After the process of S72, the luminance change coefficient acquisition of S4 is executed in order to calculate the luminance change coefficient of the first image region FE using the region of the first image region FE magnified through the process of S71. In the acquisition of the luminance change coefficient in this case, only the luminance change coefficient of the first image region FE may be acquired.

In the process of S70, when the value of the luminance change coefficient memory 12b3 of the first image region data 12b matches the value of the luminance change coefficient memory 12c3 of the second image region data 12c (S70: No), the processes of S71, S72 and S4 are skipped, and in the process of S71, when the region in the region information memory 12b1 reaches any of the end portions of the input image P (S71), the processes of S72 and S4 are skipped. After the process of S70, S71, and S4, the process of S33 described above in FIG. 4(b) is executed.

As described above, in the crossfading process of the third embodiment, when the value of the luminance change coefficient memory 12b3 of the first image region data 12b differs from the value of the luminance change coefficient memory 12c3 of the second image region data 12c, that is, when the luminance change coefficient of the first image region FE and the luminance change coefficient of the second image region FS differ from each other, the angle of view of the first image region FE is changed so that the region of the first image region FE is magnified.

Accordingly, since a large number of low-luminance pixels are included in the first image region FE with the magnified region, it becomes easy to approximate the luminance of the second image region SE that is a switching destination by crossfading. Accordingly, when switching from the first image region FE to the second image region SE is performed, it is possible to curb a sudden change in the luminance of the first image region FE and the second image region SE and thus, it is possible to curb discomfort with respect to the luminance of the user.

When the luminance change coefficient of the first image region FE matches the luminance change coefficient of the second image region FS as a result of magnifying the region of the first image region FE (S70: No), magnification of the region of the first image region FE is not executed. Accordingly, when switching from the first image region FE to the second image region SE is performed, the region of the first image region FE is not magnified unnecessarily and thus, the user's discomfort with respect to the region of the first image region FE can be curbed.

Further, even when the region of the first image region FE has reached any of the end portions of the input image P as a result of magnifying the region of the first image region FE (S71: Yes), the region of the first image region FE is not magnified. Accordingly, an abnormal image (for example, a black band) outside the input image P is not mixed in the first image region FE and thus, it is possible to curb the user's discomfort and distrust with respect to the first image region FE when switching from the first image region FE to the second image region SE is performed.

Although the above description has been made on the basis of the above embodiment, it can be easily inferred that various improvements and changes are possible.

In the above embodiment, the luminance change calculation process for calculating the luminance change coefficient on the basis of the current first and second image regions FE and SE, and the crossfading process for changing the luminance change coefficient of the first image region FE depending on the transmittance of the first image region FE have been described in the first embodiment, the luminance change calculation process for calculating the luminance change coefficient according to the current and past luminance histograms of the first and second image regions FE and SE has been described in the second embodiment, and the crossfading process for performing crossfading while changing the angle of view of the first image region FE has been described in the third embodiment. However, a combination of the luminance change calculation process and the crossfading process is not necessarily limited thereto, and may be an appropriate combination. For example, the luminance coefficient change process of the first embodiment may be combined with the crossfading process of the third embodiment, the luminance coefficient change process of the second embodiment may be combined with the crossfading process of the first embodiment, or the luminance coefficient change process of the second embodiment may be combined with the crossfading process of the third embodiment. Further, the disclosure is not limited to the luminance change calculation process and the crossfading process being executed for the first and second image regions FE and SE, and only the luminance change calculation process may be executed or only the crossfading process may be performed.

In the above embodiment, the respective luminance histograms of the first and second image regions FE and SE have been calculated from the attention point region GE. However, the disclosure is not limited thereto, and the luminance histogram may be calculated from a region other than the attention point region GE in the first and second image regions FE and SE, or may be calculated from both of the first and second image regions FE and SE.

In the above embodiment, the attention point region GE is set in the central portion of the first and second image regions FE and SE. However, the disclosure is not limited thereto, and the attention point region GE, for example, may be located at a position other than the central portion, such as the upper left and lower right of the first and second image regions FE and SE or may be located at a position of a person's face or a specific object recognized through known image processing. Further, a region designated by the user via the input device 2 may be used as the attention point region GE.

In the above embodiment, switching from the first image region FE to the second image region SE is executed by crossfading. However, an aspect of switching is not limited to crossfading and may be, for example, sliding or wiping or may be other aspects. Direct switching may be performed without using crossfading or the like from the first image region FE to the second image region SE.

In the above embodiment, in the luminance change coefficient table 11b of FIG. 2(b), 128 steps of luminance change coefficients are assigned to each evenly divided range of "luminance with the largest number". However, the disclosure is not limited thereto, and the division of the range of the "luminance with the largest number" assigned to the luminance change coefficient may be biased. For example, the range of the "luminance with the largest number" may be biased according to a degree of brightness actually felt by human.

In the above embodiment, the luminance histogram of the attention point region GE was created according to the number of pixels for each luminance, as illustrated in FIG. 2(c). However, the disclosure is not limited thereto, and for example, a range of 128 steps of luminance according to a range of "luminance with the largest number" in the luminance change coefficient table 11b of FIG. 2(b) may be used instead of the luminance, and a histogram according to the number of pixels for each range of luminance may be used as a luminance histogram. Accordingly, even when there is luminance with an outstandingly large number of pixels, the number of pixels in the range of luminance can be smoothed using the numbers of pixels of the luminance before and after that and thus, a luminance histogram indicating a state of the luminance of the attention point region GE can be shown. Further, in the luminance histogram in which such a range of luminance is divided into 128 steps, the respective ranges of luminance are not limited to being evenly divided, and the range of luminance may be biased and divided. For example, the range of luminance may be biased according to a degree of brightness actually felt by humans.

In the above embodiment, the luminance histogram in the attention point region GE is calculated as the luminance information for each of the first and second image regions FE and SE, and the luminance with the largest number of pixels in the luminance histogram is referred to in the luminance change coefficient table $11b$ so that the luminance change coefficient is acquired. However, the luminance information for which the luminance change coefficient table $11b$ is referred to is not limited to the value based on the luminance histogram, and may be, for example, a maximum value, an average value, or a median value of the luminance in the attention point region GE.

In the process of S51 of the luminance change coefficient processing (FIG. 7) of the second embodiment, the luminance histogram obtained by adding up the luminance histograms of the past luminance data in the Nth image region is generated, and the past luminance tendency is determined from the luminance histogram obtained by adding-up. However, the luminance histogram for determining the past luminance tendency is not limited thereto, and the past luminance tendency may be determined according to the luminance histogram based on the average value or the maximum value of the luminance histogram of the past luminance data in the Nth image region or the past luminance tendency may be determined according to another luminance histogram on the basis of the luminance histogram of the past luminance data in the Nth image region.

In the luminance change coefficient processing of the second embodiment, when the luminance tendencies of the current luminance tendency memory and the past luminance tendency memory of the Nth image region differ (S53: Yes), the target value of the luminance change coefficient is set to 0 (S54). The target value of the luminance change coefficient in such a case is not limited to 0 and may be a value greater than 0 or may be a value smaller than 0. Further, the disclosure is not limited to a constant value being set for the target value of the luminance change coefficient, and a change coefficient in a case in which luminance change is performed on an image region having medium luminance may be calculated and set as the target value of the luminance change coefficient.

Further, the previous luminance change coefficient may be used as the target value of the luminance change coefficient. Accordingly, even when light and darkness of the Nth image region is frequently switched, the luminance change coefficient does not change greatly each time and thus, the change in luminance due to the luminance change can be curbed, and discomfort with respect to the luminance can be curbed.

In the crossfading process of the third embodiment (FIG. 9), when the luminance change coefficient of the first image region FE differs from the luminance change coefficient of the second image region SE (S70: Yes) and the region of the first image region FE has not reached any of the end portions of the input image P (S71: No), the region of the first image region FE is magnified (zoomed out) so that the angle of view of the first image region FE is changed. However, the disclosure is not limited thereto, and for example, the region of the first image region FE may be reduced (zoomed in) or the region of the first image region FE may be moved up, down, left, or right.

In the above embodiment, when switching from the first image region FE to the second image region SE is performed, the transmittance of the first image region FE and the second image region SE is changed over time, but the disclosure is not necessarily limited thereto and for example, the transmittance of the first image region FE and the second image region SE may be changed according to an input from the input device 2.

In the above embodiment, the input image P is acquired from the 4K camera, but the input image P is not limited to the image acquired from the 4K camera, and may be input from another imaging device, or an image stored in the flash ROM 11 or an external storage device (an HDD or the like) may be used as the input image P.

In the above embodiment, the resolution of the input image P is set to 4K resolution, and the resolutions of the first and second image regions FE and SE are set to resolutions lower than the 4K resolution, but the resolution is not limited thereto. The resolution of the input image P may be the same as the resolutions of the first and second image regions FE and SE, or the resolutions of the first and second image regions FE and SE may be higher than the resolution of the input image P.

Here, when the first and second image regions FE and SE are cut out from the input image P and magnified, image quality of the first and second image regions FE and SE that have been cut out is lower than that of the input image P. As in the above embodiment, when the resolution of the input image P is higher than the resolution of the first and second image regions FE and SE, degradation of image quality in a case in which the first and second image regions FE and SE are cut out and magnified can be made unnoticeable.

In the above embodiment, a range of the luminance of the input image P is set to HDR wider than SDR, which is a range of the luminance of the first and second image regions FE and SE, but the disclosure is not limited thereto. For example, the range of the luminance of the first and second image regions FE and SE may be wider than the range of the luminance of the input image P. Further, the range of the luminance of the input image P is not limited to HDR, and may be a range of luminance much wider than HDR.

In the above embodiment, the case in which the image regions to be cut out from the input image P are two regions including the first image region FE and the second image region SE is illustrated, but the number of image regions is not limited to two and may be equal to or greater than two or may be only one.

In the above embodiment, in the process of S9 in FIG. 3, the generated image is output to the video output device 18 and displayed on the external monitor 5. However, the disclosure is not necessarily limited thereto, and the generated image may be displayed on a monitor or projector other than the external monitor 5, or may be stored in the flash ROM 11 or an external storage device (an HDD or the like).

In the embodiments, the image processing device 1 in which the image processing program $11a$ is incorporated has been illustrated, but the disclosure is not limited thereto, and a configuration in which the image processing program $11a$ is executed in an information processing device (a computer) such as a personal computer, a smartphone, or a tablet terminal may be adopted.

The numerical values given in the embodiments are examples, and it is obvious that other numerical values can be adopted.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An image processing device comprising:
an input part configured to input an input image;
a cutout part configured to cut out a plurality of image regions from the input image input by the input part;
a luminance change part configured to execute luminance change of each of the image regions cut out by the cutout part;
a luminance information calculation part configured to calculate luminance information that is information on luminance for each of the image regions cut out by the cutout part;
a luminance information storage part configured to store the luminance information for each of the image regions calculated by the luminance information calculation part;
a past luminance determination part configured to determine a luminance tendency indicating a high or low of luminance of past luminance for each of the image regions from the luminance information for each of the image regions stored in the luminance information storage part; and
a current luminance determination part configured to determine a current luminance tendency for each of the image regions from current luminance information for each of the image regions calculated by the luminance information calculation part,
wherein each of the plurality of image regions is a rectangular area of the input image, and
the luminance change part is configured to execute the luminance change of a corresponding image region in the image regions on a basis of the luminance information for each of the image regions calculated by the luminance information calculation part, and
the luminance change part executes the luminance change of the corresponding image region on a basis of a change of the luminance tendency determined by the past luminance determination part and the luminance tendency determined by the current luminance determination part in the same image region.

2. The image processing device according to claim 1, wherein the luminance information storage part stores a luminance change coefficient together with the luminance information for each of the image regions, the luminance change coefficient being a coefficient used for the luminance change of the luminance change part;
the image processing device further comprises a standard coefficient acquisition part configured to acquire a standard coefficient, the standard coefficient being the luminance change coefficient in a case in which the luminance change is performed on the image region in which a luminance tendency is medium luminance, and
in a case when the luminance tendency determined by the past luminance determination part and the luminance tendency determined by the current luminance determination part in the same image region differ, the luminance change part executes the luminance change of the corresponding image region using the luminance change coefficient according to an intermediate value between the past luminance change coefficient of the corresponding image region stored in the luminance information storage part and the standard coefficient acquired by the standard coefficient acquisition part.

3. The image processing device according to claim 1, further comprising:
a change coefficient calculation part configured to calculate a luminance change coefficient used for the luminance change of the luminance change part from the luminance info illation for each of the image regions calculated by the luminance information calculation part,
wherein the luminance information storage part stores the luminance change coefficient used for the luminance change of the luminance change part together with the luminance information for each of the image regions, and
in a case when the luminance tendency determined by the past luminance determination part and the luminance tendency determined by the current luminance determination part are the same in the same image region, the luminance change part executes the luminance change of the corresponding image region using the luminance change coefficient according to an intermediate value between the past luminance change coefficient of the corresponding image region stored in the luminance information storage part and the current luminance change coefficient of the corresponding image region calculated by the change coefficient calculation part.

4. The image processing device according to claim 2, further comprising:
a change coefficient calculation part configured to calculate a luminance change coefficient used for the luminance change of the luminance change part from the luminance information for each of the image regions calculated by the luminance information calculation part,
wherein the luminance information storage part stores the luminance change coefficient used for the luminance change of the luminance change part together with the luminance information for each of the image regions, and
in a case when the luminance tendency determined by the past luminance determination part and the luminance tendency determined by the current luminance determination part are the same in the same image region, the luminance change part executes the luminance change of the corresponding image region using the luminance change coefficient according to an intermediate value between the past luminance change coefficient of the corresponding image region stored in the luminance information storage part and the current luminance change coefficient of the corresponding image region calculated by the change coefficient calculation part.

5. The image processing device according to claim 1, further comprising:
a change coefficient calculation part configured to calculate a luminance change coefficient used for the luminance change of the luminance change part from the luminance information for each of the image regions calculated by the luminance information calculation part;
a switching image generation part configured to generate an image gradually changed from one image region to another image region while mixing the one image region with the other image region, on which the luminance change having been performed on the image regions by the luminance change part; and
a mixing ratio acquisition part configured to acquire a mixing ratio of the one image region in the switching image generation part,
wherein, when the luminance change part performs the luminance change on the one of the image regions combined by the switching image generation part, the luminance change part executes the luminance change using the luminance change coefficient obtained by changing the luminance change coefficient of the one of the image regions calculated by the change coefficient calculation part to the luminance change coefficient of the other image region calculated by the change coefficient calculation part according to the mixing ratio acquired by the mixing ratio acquisition part.

6. The image processing device according to claim 2, further comprising:
a change coefficient calculation part configured to calculate a luminance change coefficient used for the luminance change of the luminance change part from the luminance information for each of the image regions calculated by the luminance information calculation part,
a switching image generation part configured to generate an image gradually changed from one image region to another image region while mixing the one image region with the other image region, on which the luminance change having been performed on the image regions by the luminance change part; and
a mixing ratio acquisition part configured to acquire a mixing ratio of the one image region in the switching image generation part,
wherein, when the luminance change part performs the luminance change on the one of the image regions combined by the switching image generation part, the luminance change part executes the luminance change using the luminance change coefficient obtained by changing the luminance change coefficient of the one of the image regions calculated by the change coefficient calculation part to the luminance change coefficient of the other image region calculated by the change coefficient calculation part according to the mixing ratio acquired by the mixing ratio acquisition part.

7. The image processing device according to claim 1, further comprising:
a change coefficient calculation part configured to calculate a luminance change coefficient used for the luminance change of the luminance change part from the luminance information for each image region calculated by the luminance information calculation part; and
a switching image generation part configured to perform gradual change from one of the image regions to another image region while mixing the one image region with the other image region, the luminance change having been performed on the image regions by the luminance change part,
wherein the cutout part cuts out the one image region again according to a changed view angle changed from a view angle of the one image region when the luminance change coefficient of the one image region calculated by the change coefficient calculation part differs from the luminance change coefficient of the other image region calculated by the change coefficient calculation part, and
the switching image generation part performs gradual change from the one image region that has been cut out again by the cutout part to the other image region.

8. The image processing device according to claim 2, further comprising:
a change coefficient calculation part configured to calculate a luminance change coefficient used for the luminance change of the luminance change part from the luminance information for each image region calculated by the luminance information calculation part; and
a switching image generation part configured to perform gradual change from one of the image regions to another image region while mixing the one image region with the other image region, the luminance change having been performed on the image regions by the luminance change part,
wherein the cutout part cuts out the one image region again according to a changed view angle changed from a view angle of the one image region when the luminance change coefficient of the one image region calculated by the change coefficient calculation part differs from the luminance change coefficient of the other image region calculated by the change coefficient calculation part, and
the switching image generation part performs gradual change from the one image region that has been cut out again by the cutout part to the other image region.

9. The image processing device according to claim 7, wherein, in a case when the luminance change coefficient of the one image region calculated by the change coefficient calculation part matches the luminance change coefficient of another image region calculated by the change coefficient calculation part, the cutout part stops a change in the view angle of the one image region.

10. The image processing device according to claim 1, wherein the luminance information calculation part calculates a luminance histogram as the luminance information, the luminance histogram being a histogram of the luminance of the image regions.

11. The image processing device according to claim 1, wherein the luminance information calculation part calculates the luminance information on a basis of luminance of an attention point region, the attention point region being a region in which a target to be noted is present in the image region.

12. An image processing device comprising:
a cutout part configured to cut out a plurality of image regions from an input image, the plurality of image regions comprises a first image region and a second image region;
a luminance change part configured to execute luminance change of each of the image regions cut out by the cutout part;
a luminance information calculation part configured to calculate luminance information that is information on luminance for each of the image regions cut out by the cutout part;
a switching image generation part configured to generate an image gradually changed from the first image region to the second image region, the image regions being cut out by the cutout part;
an image switching part configured to switch from the first image region to the second image region by crossfading, and
an output part configured to output the first image region and the second image region to a display,
wherein each of the plurality of image regions is a rectangular area of the input image, and
wherein each of the first image region and the second image region is a rectangular area of the input image,
wherein the image processing device further comprises:
a change coefficient calculation part configured to calculate a luminance change coefficient used for the luminance change of the luminance change part from the luminance information for each of the image regions calculated by the luminance information calculation part;
a switching image generation part configured to generate an image gradually changed from one image region to another image region while mixing the one image region with the other image region, on which the luminance change having been performed on the image regions by the luminance change part; and
a mixing ratio acquisition part configured to acquire a mixing ratio of the one image region in the switching image generation part,
wherein, when the luminance change part performs the luminance change on the one of the image regions combined by the switching image generation part, the luminance change part executes the luminance change using the luminance change coefficient obtained by changing the luminance change coefficient of the one of the image regions calculated by the change coefficient calculation part to the luminance change coefficient of the other image region calculated by the change coefficient calculation part according to the mixing ratio acquired by the mixing ratio acquisition part.

13. An image processing method executed by an image processing device, the image processing method comprising:
inputting an input image;
cutting out a plurality of image regions from the input image, the images regions being different parts of the input image;
a luminance information calculation step of calculating luminance information for each of the image regions that has been cut out, the luminance information being information on luminance; and
a luminance change step of executing luminance change of a corresponding image region on the image regions on a basis of the luminance information for each of the image regions calculated in the luminance information calculation step to change a luminance of one of the image regions calculated in the luminance information calculation step into a luminance of another of the image regions calculated in the luminance information calculation step,
wherein each of the plurality of image regions is a rectangular area of the input image.

14. The image processing method according to claim 13, further comprising:
a luminance information storage step of storing the luminance information for each of the image regions calculated in the luminance information calculation step;
a past luminance determination step of determining a luminance tendency indicating a high or low of luminance of past luminance for each of the image regions from the luminance information for each of the image regions stored in the luminance information storage step; and
a current luminance determination step of determining a current luminance tendency for each of the image regions from current luminance information for each of the image regions calculated in the luminance information calculation step,
wherein the luminance change step comprises executing the luminance change of the corresponding image region on a basis of a change of the luminance tendency determined in the past luminance determination step and the luminance tendency determined in the current luminance determination step in the same image region.

15. The image processing method according to claim 14, wherein the luminance information storage step comprises storing a luminance change coefficient together with the luminance information for each of the image regions, the luminance change coefficient being a coefficient used for the luminance change in the luminance change step; and
a standard coefficient acquisition step of acquiring a standard coefficient, the standard coefficient being the luminance change coefficient in a case in which the luminance change is performed on the image region in which a luminance tendency is medium luminance, and
the luminance change step comprises executing the luminance change of the corresponding image region using the luminance change coefficient according to an intermediate value between the past luminance change coefficient of the corresponding image region stored in the luminance information storage step and the standard coefficient acquired in the standard coefficient acquisition step when the luminance tendency determined in the past luminance determination step and the luminance tendency determined in the current luminance determination part in the same image region differ.

16. The image processing method according to claim 14, further comprising:
a change coefficient calculation step of calculating a luminance change coefficient used for the luminance change in the luminance change step from the luminance information for each of the image regions calculated in the luminance information calculation step,
wherein the luminance information storage step comprises storing the luminance change coefficient used for the luminance change in the luminance change step together with the luminance information for each of the image regions, and
the luminance change step comprises executing the luminance change of the corresponding image region using the luminance change coefficient according to an intermediate value between the past luminance change coefficient of the corresponding image region stored in the luminance information storage step and the current luminance change coefficient of the corresponding image region calculated in the change coefficient calculation step when the luminance tendency determined in the past luminance determination step and the luminance tendency determined in the current luminance determination part in the same image region differ.

17. The image processing device according to claim 1, wherein the plurality of image regions comprises a first image region and a second image region, and
the image processing device further comprises:
an output part configured to output the first image region and the second image region to a display,
wherein each of the first image region and the second image region is a rectangular area of the input image.

18. The image processing device according to claim 17, further comprising:
an image switching part configured to switch from the first image region to the second image region.

19. The image processing device according to claim 18, wherein the luminance change part is configured to execute luminance change of each of the image regions cut out by the cutout part, such that a luminance of the first image region matches a luminance of the second image region.

\* \* \* \* \*